United States Patent
Chau et al.

(10) Patent No.: US 10,951,536 B1
(45) Date of Patent: Mar. 16, 2021

(54) SEQUENCE NUMBER RECOVERY IN STATEFUL DEVICES

(71) Applicant: Cisco Technology, Inc., San Jose, CA (US)

(72) Inventors: Hung Chau, Highland, CA (US); Zhijun Liu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/591,189

(22) Filed: Oct. 2, 2019

(51) Int. Cl.
*H04L 12/801* (2013.01)
*H04L 12/26* (2006.01)
*H04L 12/24* (2006.01)
*H04L 29/08* (2006.01)

(52) U.S. Cl.
CPC .......... *H04L 47/34* (2013.01); *H04L 41/0654* (2013.01); *H04L 43/16* (2013.01); *H04L 69/324* (2013.01)

(58) Field of Classification Search
CPC ..... H04L 47/34; H04L 43/16; H04L 41/0654; H04L 69/324
See application file for complete search history.

(56) References Cited

U.S. PATENT DOCUMENTS

| | | | |
|---|---|---|---|
| 7,664,855 B1 * | 2/2010 | Freed | H04L 63/1466 709/225 |
| 10,516,789 B2 * | 12/2019 | Kambegawa | H04L 1/1867 |
| 2010/0091621 A1 * | 4/2010 | Mizuno | H04L 67/1097 369/33.01 |
| 2016/0113045 A1 * | 4/2016 | Kang | H04W 12/003 370/338 |

* cited by examiner

*Primary Examiner* — Andrew Lai
*Assistant Examiner* — Harry H Kim
(74) *Attorney, Agent, or Firm* — Lee & Hayes, P.C.

(57) ABSTRACT

In one embodiment, a network security device configured to monitor a communication session between a first device and a second device generates a first empty acknowledgment packet specifying a first sequence number and sends the first empty acknowledgment packet to the first device. The network security device may thereafter determine that a response from the first device has not been received within a threshold amount of time and generate, at least partly in response, a second empty acknowledgment packet specifying a second sequence number. The network security device may send the second empty acknowledgment packet to the first device and receive, from the first device, a third empty acknowledgment packet specifying a third sequence number. The network security device may then store the third sequence number in association with the communication session between the first device and the second device.

20 Claims, 13 Drawing Sheets

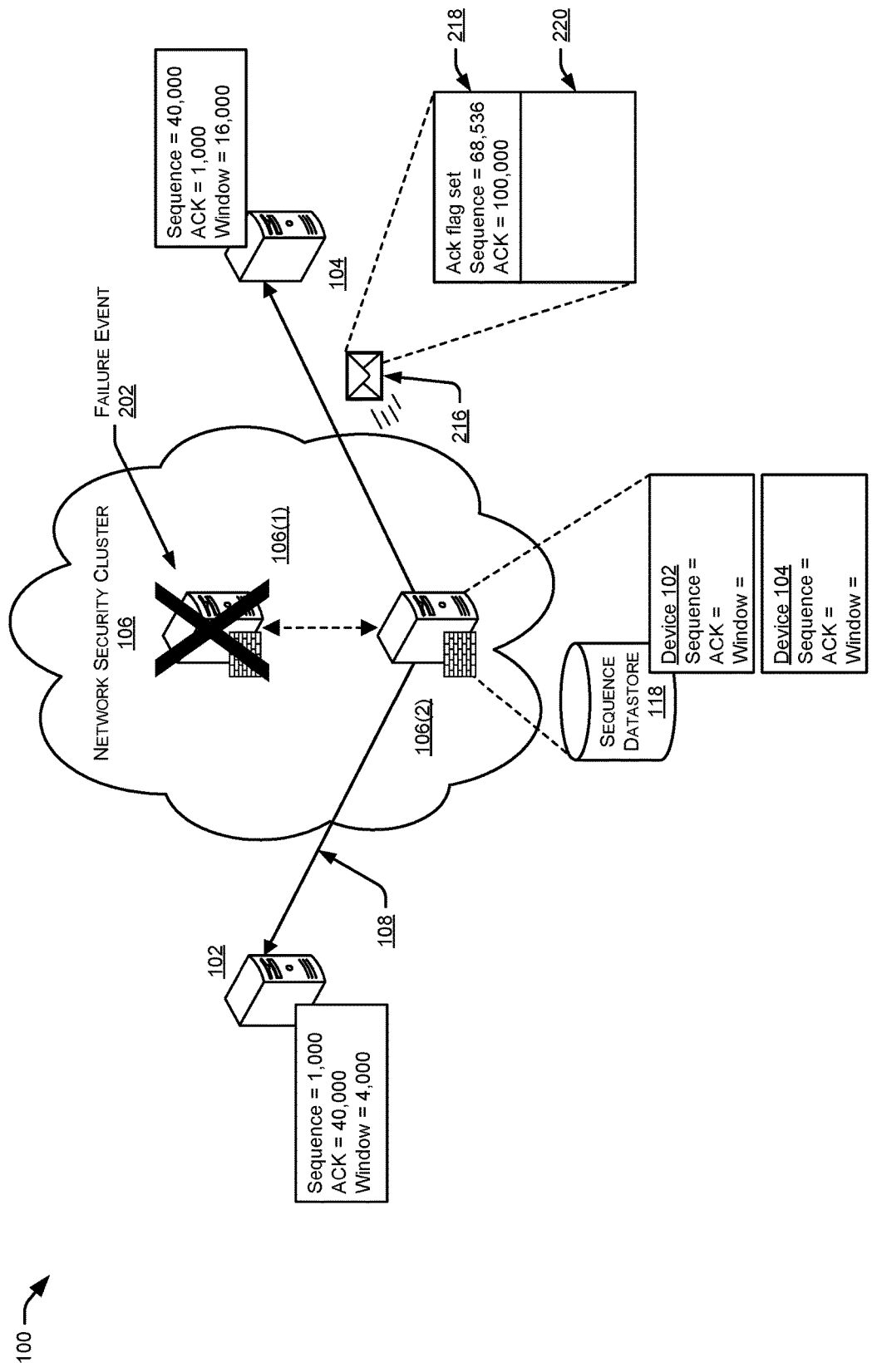

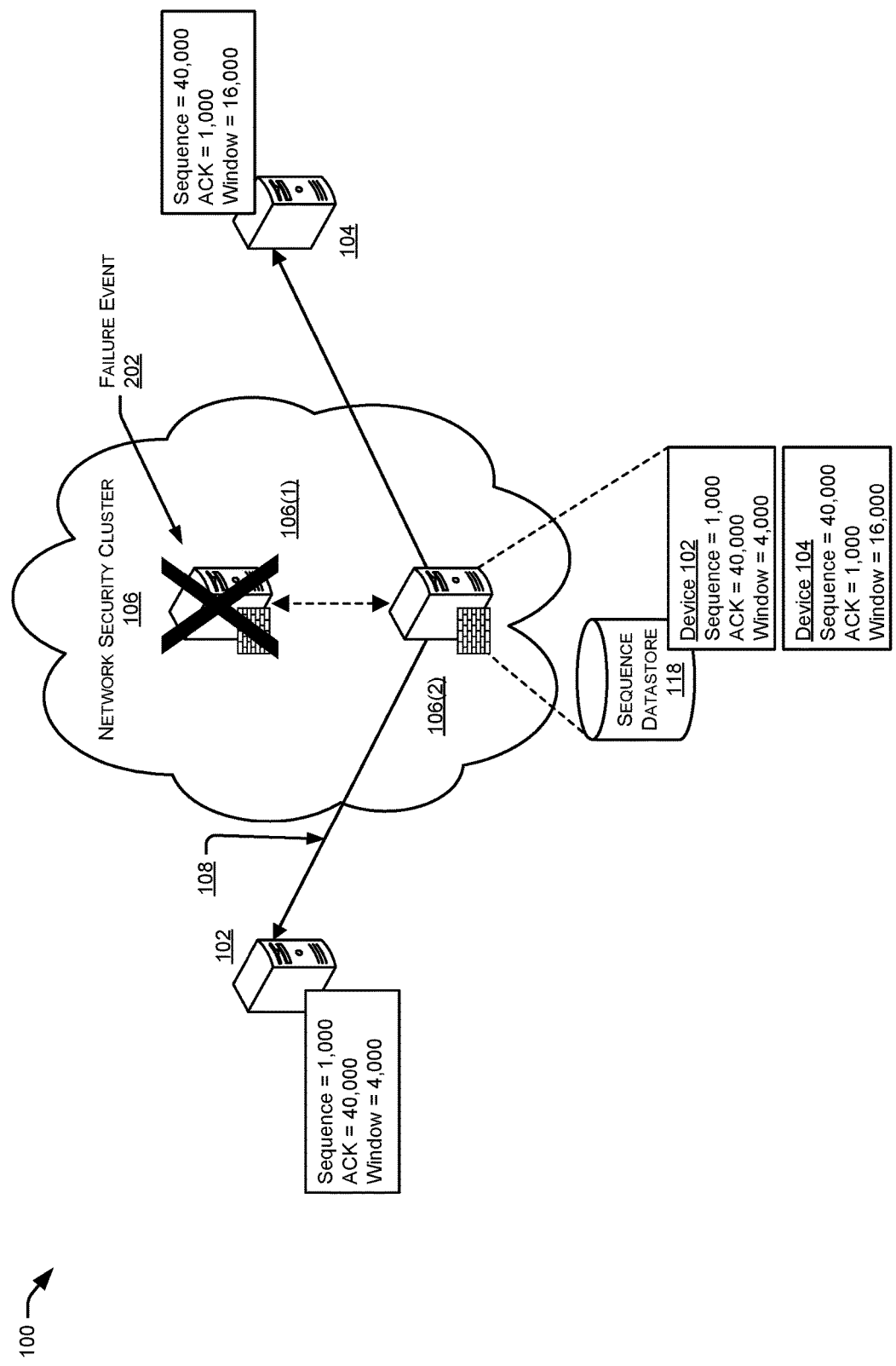

US 10,951,536 B1

SEQUENCE NUMBER RECOVERY IN STATEFUL DEVICES

TECHNICAL FIELD

The present disclosure relates generally to optimizing network traffic exchanged between devices in a network environment.

BACKGROUND

In network environments, a client device and a server may be configured to exchange communications with each other. These communications may traverse a network path that includes one or more stateful network devices, such as firewall devices, which typically analyze communications (e.g., packets) to determine whether the communications should be forwarded to a destination device. For example, a firewall device may reside in a network path between the client device and the server, and upon receiving a packet destined for the server device, the firewall device may analyze information in the packet to determine whether the packet is authorized to be sent to the server device (or vice versa). If the packet is an unauthorized packet (e.g., if the packet is unknown or harmful), the firewall device will discard the packet. If the packet is authorized, the firewall device will forward the packet to the client device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-G illustrate an example scenario where the second firewall device of FIG. 1 switches from a standby state to an active state in response to the first firewall device experiencing a failure event, as well as the second firewall device recovering sequence information associated with the communication session between the client device and the server device.

DESCRIPTION OF EXAMPLE EMBODIMENTS

Overview

Figure 1:
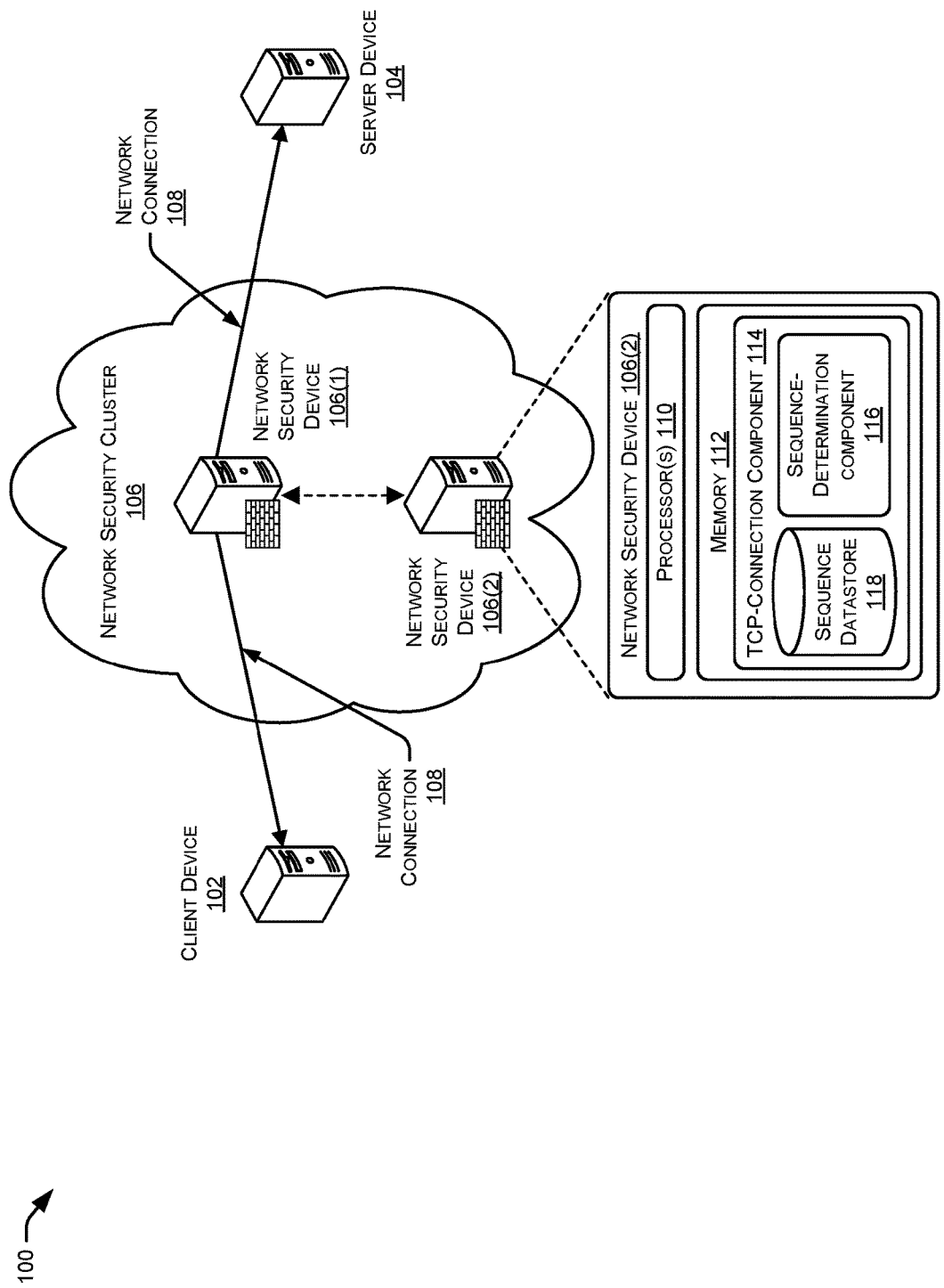
FIG. 1 illustrates an example network topology that includes a client device engaged in a communication session with a server device through a first firewall device of a network security cluster. As illustrated, a second firewall device of the network security cluster includes a transmission-control-protocol (TCP) component configured to determine sequence information associated with the communication session in response to the first firewall device experiencing a failure event and the second firewall device switching from a standby state to an active state.

This disclosure describes, in part, a network security device configured to monitor a communication session between a first device and a second device. The network security device may be configured to generate a first empty acknowledgment packet specifying a first sequence number and send the first empty acknowledgment packet to the first device. In addition, the network security device may be configured to determine that a response from the first device has not been received within a threshold amount of time and generate, at least partly in response, a second empty acknowledgment packet specifying a second sequence number. The network security device may also be configured to send the second empty acknowledgment packet to the first device and receiving, from the first device, a third empty acknowledgment packet specifying a third sequence number. The network security device may be configured to store the third sequence number in association with the communication session between the first device and the second device.

This disclosure also describes, in part, a method implemented at least in part by a network security device communicatively coupled to a first device and a second device. The method may include generating a first packet specifying a first sequence number, sending the first packet to the first device, determining that a response from the first device has not been received within a threshold amount of time, and generating, at least partly in response to the determining, a second packet specifying a second sequence number. The method may further include sending the second packet to the first device, receiving, from the first device, a third packet specifying a third sequence number, and storing the third sequence number in association with a communication session between the first device and the second device.

This disclose also describes, in part, a network security device communicatively coupled to a first device and a second device. The network security device may be configured to send, to the first device, a first empty acknowledgment packet specifying a first sequence number, receive, from the first device, a second empty acknowledgment packet specifying a second sequence number, and store the second sequence number in association with a communication session between the first device and the second device.

The techniques described herein may be performed by a system and/or device having non-transitory computer-readable media storing computer-executable instructions that, when executed by one or more processors, performs methods described herein.

EXAMPLE EMBODIMENTS

This disclosure describes, in part, techniques enabling a network security device to recover sequence information associated with a communication session between a first device and a second device. In some instances, the network security device sends, to the first and/or the second device, an empty acknowledgment packet specifying a randomly selected sequence number. If the network security device does not receive an acknowledgment packet from the first device in response, the network security device may increment the randomly selected sequence number by a predefined offset amount, generate a second empty acknowledgment packet specifying this second sequence number, and send the second empty acknowledgment packet to the first device. The network security device may continue this process until the sequence number sent with an empty acknowledgment packet is outside a current window of the first device, thus causing the first device to send an acknowledgment packet back to the network security device, with this packet specifying the next sequence number and window size associated with the communication session between the first and second device. In response to receiving this packet, the network security device may store this information in association with the communication session.

To provide an example, envision that a client device is currently engaged in a communication session with a server device, with communications therebetween being routed through a first network security device (e.g., a firewall device) of a cluster of network security devices. In some instances, the client and server devices communicate via transmission control protocol (TCP) in which the communications occur in a numbered sequence. The first network security device may receive each communication, ensure the communication is in sequence, and, if the communication is in sequence or within a current TCP window and not deemed harmful, may send the communication along to its destination. Therefore, the first network security device stores this sequence information in association with the communication session in order to ensure that only in-window communications are sent to the destination device (and thereby avoiding the sending of any spoofed communications).

In some instances, however, the first network security device may experience a failure event, such as the device itself failing, a connection between the device and the client and/or server device failing, and/or the like. In response to the first network security device experiencing this type of failure event, a second network security device of the cluster may transition from a standby state to an active state and may assume responsibility of performing the security operations for this communication session previously performed by the first network security device. In this example, however, the second network security device may not "know" the sequence information associated with the communication session. That is, the second network security device might not store the sequence information associated with the communication session and, thus, may currently be unable to determine whether communications received that are actually or purportedly associated with the communication session are within an expected TCP window.

Thus, the second network security device may be configured to recover the sequence information associated with the communication session via one or more interactions with the client and/or server devices. For example, in response to transitioning from the standby to the active state, the second network security device may generate a first empty acknowledgment packet specifying a randomly selected sequence number and may send this first empty acknowledgment packet to the client or server device. That is, the second network security device may generate a packet having the acknowledgment flag set and that includes a randomly selected sequence number, potentially along with a randomly selected acknowledgment number. The payload, meanwhile, may be empty, thus resulting in the packet being an empty acknowledgment packet.

After the second network security device sends the first empty acknowledgment packet to, for example, the server device, the second network device may determine whether a response from the server device is received within a predefined amount of time. If not—meaning that the selected sequence number was within a current window of sequence numbers that are currently acceptable by the server device (assuming the server is still serving the connection)—then the second network security device may send, to the server device, a second empty acknowledgment packet specifying a second sequence number. In some instances, this second sequence number comprises the first sequence number increased or decreased by a predefined offset, such as by a maximum window size of bytes (e.g., 65536, etc.). Again, the second network security device may determine whether the server device sends a response within the predefined amount of time to determine whether to send yet another empty acknowledgment packet. If, however, the second network security device receives a response, the second network security device may use the information in the response message to determine the sequence information associated with the communication, as discussed below.

In this regard, upon receiving the first empty acknowledgment packet, the server device may analyze, from the header of the packet, the sequence number to determine whether the specified sequence number is within a current window of sequence numbers that the second server device will currently accept from the client device. If so, then the server device will simply drop the packet, given that: (1) that packet is within the currently acceptable window, but (2) the packet does not include a payload.

If, however, the sequence number specified in the first empty acknowledgment packet is out of the window, then the server device may be configured to send an empty acknowledgment packet back to the second network security device. That is, the server device may determine its next sequence number and the next acknowledgment number that the server device maintains and send a packet having the acknowledgment flag set and the sequence information (e.g., sequence number, acknowledgment number, and window size) specified in the TCP header to the second network security device. In some instances, this packet may also be free of a payload.

Upon receiving this packet from the server device, the second network security device may determine the sequence information from the packet. That is, the second network security device may read the TCP header to identify the specified sequence number, acknowledgment number, and window size and may store this sequence information for use in performing security functions associated with the communication session. Further, in some instances, the second network security device may also send an empty acknowledgment packet specifying a sequence number to the client device. In some instances, given that the second network security device knows the next sequence number associated with the communications of the client device (via the acknowledgment number received from the server device), the second network security device may attempt to select a sequence number having a high likelihood to be outside of a currently acceptable window of sequence numbers.

Upon receiving this empty acknowledgment packet from the second network security device, the client device may determine whether the specified sequence number is within an acceptable window size of sequence numbers for communications received from the server device. If so, the client device may simply drop the packet, given that it is free from a payload. Again, the network security device may determine, in this scenario, that it has not received a response within the predefined amount of time and, thus, may generate another empty acknowledgment packet specifying another sequence number and may send this empty acknowledgment packet to client device. Upon the client device receiving an empty acknowledgment packet specifying a sequence number that is outside of the acceptable window for communications received from the server device, the client device may generate a packet specifying the sequence information that the client device stores, namely its next sequence number, acknowledgment number, and acceptable window size for communications received from the server device.

Upon receiving this packet, the second network security device may identify and store the sequence information. At this point, it is to be appreciated that the second network security device now stores complete and up-to-date sequence information, such as the next sequence number and window size for communications from the client device and the next sequence number and window size for communications from the server device. Thus, upon receiving subsequent communications of the communication session from the client and/or server device, the second network security device may ensure that the respective communication is within the acceptable window size. If not, the second network security device may discard the communication. Stated otherwise, the second network security device may now perform the security functions for the communication session between the client and server devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example network topology 100 that includes a client device 102 engaged in a communication session with a server device 104 through a first network security device (e.g., firewall device) 106(1) of a network security cluster 106. Within the illustrated network topology 100, the client device 102 may exchange communications (e.g., packets) with the server device 104 via a network connection 108. The network connection 108 may be a transport control protocol (TCP) network connection or any network connection that enables the client device 102 and the server 104 to exchange packets with each other. The network connection 108 represents, for example, a data path between the client device 102 and the server 104 that may include one or more network security devices of the cluster 106. For example, as shown in FIG. 1, the network connection 108 traverses the network security device 106(1) but may include the network security device 106(2) instead of the network security device 106(1) upon a failure event of the network security device 106(1), as described below. It should be appreciated that the term "network connection" may also be referred to as a "network path."

The client device 102 and the server device 104 are network devices configured to send and receive packets. For example, the client device 102 may be a computer, laptop, mobile device, tablet, etc., and the server 104 may be a network device that is configured to provide network services to the client device 102. The network security devices 106(1) and 106(2), meanwhile, may comprise network devices that are configured to monitor and evaluate network communications (e.g., packets) to determine whether the packets should be forwarded to their intended destination in the network 100. For example, in FIG. 1, when the network security device 106(1) is in the network path 108 between the client device 102 and the server device 104, the network security device 106(1) may monitor and evaluate packets destined for the client device 102 (e.g., received from the server device 104 or from another network entity). The network security device 106(1) may determine whether the packets are authorized. If the packets are authorized, the network security device 106(1) may forward the packets to the client device 102. If the packets are not authorized, however, the network security device 106(1) may discard the packets. For example, an outside party that is not part of the network connection 108 between the client device 102 and the server 104 may attempt to spoof packets or otherwise send unauthorized or harmful packets to either the client device 102 or the server device 104. A firewall device residing in the network path between client device 102 and the server 104 may provide protection to the client device 102 and the server device 104 by preventing unauthorized packets from being forwarded along the network connection 108.

Network security devices of the cluster 106 may be in either an "active" state or a "standby" state, with these states potentially being specific to a particular connection. For example, in the illustrated example of FIG. 1, the network security device 106(1) is in the active state with regards to the network connection 108 but may be in the standby state with regards to other network connections. The network security device 106(2), meanwhile, is in the standby state with reference to the network connection 108 but may be in an active state with regards to other network connections. Furthermore, the network security devices 106(1) and 106(2) may be "stateful" network device, given that they maintain connection-state information (e.g., TCP information) and utilize the connection-state information to for example, determine whether to reject unauthorized packets.

Further, since the network security devices 106(1) and 106(2) are part of the same cluster 106, in one example, when the network security device 106(1) is in an active state for a particular network connection, the network security device 106(2) is in a standby state. When the network security device 106(1) is in the active state, it maintains sequencing information to evaluate packets sent along the network connection 108 to determine whether the packets are authorized, and accordingly, to provide protection services to the client device 102 and the server device 104. This network security device 106(1), however, may experience a failure event and, as a result, may be unable to perform protection services for the client device 102 and the server device 104 for packets sent along the network connection 108. In response, the network security device 106(2) may change from a standby state to an active state and may take over protective services for the client device 102 and the server device 104. That is, when the network security device 106(2) changes to the active state, this device will provide protection services to the client device 102 and the server device 104 for packets sent along the network connection 108. Thus, upon changing from the standby state to the active state, the network security device 106(2) resides in the network path between the client device 102 and the server device 104 as a part of the network connection 108. Stated otherwise, when the network security device 106(1) experiences the failure event, the network connection 108 will still be present between the client device 102 and the server device 104 but will include the network security device 106(2).

At this point, however, the network security device 106(2) might not store the synchronization (or "sequence") information for providing the protective servers for the communication session between the client device 102 and the server device 104. That is, the network security device 106(2) might not store synchronization or sequence information comprising expected sequence numbers and expected acknowledgment numbers for packets (e.g., for TCP packets). The expected sequence numbers and expected acknowledgment numbers may indicate, to the active network security device, what the next-expected sequence and acknowledgment numbers should be for packets received by the active network security device along the network connection 108. With this synchronization information, the active network security device can evaluate a transit TCP packet (e.g., sent by the client device 102, the server device 104 or another third-party device that is attempting to spoof packets in the network connection 108) to determine the sequence number and acknowledgment number of the transit TCP packet. If the sequence number and the acknowledgment number of the TCP packet conform with the next-expected values indicated in the synchronization information (e.g., are within a specified window), the active network security device may forward the packet in the network 100. If the sequence number and the acknowledgment number of the TCP packet do not conform with the next-expected values (e.g., are outside of the window), the active network security device may discard the packet. Additionally, in another example, the acknowledgment number of the TCP packet can be used to authenticate the next sequence number of a packet received from the server device 104, and likewise, the sequence number of the TCP packet can be used to authenticate the next acknowledgment number of a packet received from the client device 102. In other words, the sequence number and the acknowledgment number can be used to predict the next-expected values.

Thus, stateful network security devices may provide protection services along a network connection by tracking sequence numbers and acknowledgment numbers of transit packets to allow conforming packets to traverse a network security device in the network 100 and to prevent nonconforming packets from traversing the network security device in the network 100. However, as stated above, an active network security device may experience a failure event, and as a result, another network security device previously in a standby state may be activated to provide protection services along the network connection. In the network 100 in FIG. 1, the network security device 106(1) is initially the active device. However, upon the network security device 106(1) experiencing the failure event, the network security device 106(2) activates to become the new active device, at which point this device may attempt to obtain the synchronization information associated with the communication session (e.g., the expected sequence numbers, expected acknowledgment numbers, and acceptable window size(s)) to provide the protection services for client device 102 and the server device 104 along the network connection 108.

In some traditional network environments, to ensure that the network security device 106(2) has the necessary synchronization information, the initially active network security device 106(1) sends connection updates (including the synchronization information) for the network connection 108 to the network security device 106(2) while the network security device 106(1) is the active device. That is, while the network security device 106(1) is active (e.g., before the failure event), the network security device 106(1) may send the expected sequence numbers and acknowledgment numbers to network security device 106(2) for packets on the network connection 108 between the client device 102 and the server device 104. However, as network environments scale and as more security-device clusters are included in a network environment, it becomes bandwidth-intensive and resource-consuming for active network security devices to send the synchronization information to each network security device in a standby state. The techniques described herein, however, enable network security devices to obtain synchronization information efficiently after occurrence of a failure event and even if the network security devices are not actively exchanging communications with each other during the switchover event, as described below.

As illustrated, the network security device 106(2), as well as potentially each network security device of the cluster 106, comprises one or more processors 110 and memory 110. The memory 110 may store a TCP-connection component 114 configured to determine sequence information associated with the communication session between the client device 102 and the server device 104 in response to the network security device 106(1) experiencing a failure event and the network security device 106(2) switching from a standby state to an active state. For example, the TCP-connection component 114 may include a sequence-determination component 116 for determining the sequence information for the network connection 108 and a sequence datastore 118 for storing the determined sequence information.

In some instances, in response to the network security device 106(2) transitioning from the standby state to the active state, the sequence-determination component 116 may generate a first empty acknowledgment packet specifying a randomly selected sequence number and may send this packet to the client and/or server device. Because the recipient device of this packet will simply drop the packet (given that it has no payload) if the sequence number is within an expected window of sequence numbers but will respond to the network security device if not, after sending the first empty acknowledgment packet the network security device may determine whether a response is received within a threshold amount of time. If not, meaning that the specified sequence number was within the acceptable window (or the packet was dropped in transit), the sequence-determination component 116 may increment the specified sequence number by a predefined offset amount and send the second packet to the client or the server device. The sequence-determination component 116 may continue this process until the sequence-determination component 116 receives a response packet from the recipient device.

Upon receiving the response packet from the recipient device, the sequence-determination component 116 may identify the specified sequence information from the packet and may store this information in the sequence datastore 118. For example, the sequence-determination component 116 may identify the specified sequence number, acknowledgment number, and window size from the received packet and may store this information in the sequence datastore 118. Furthermore, the sequence-determination component 116 may perform the same process to the other of the server or the client device, until receiving a response packet from this recipient device. Upon receiving this second response packet (from the other of the client or server device), the sequence-determination component 116 may identify the sequence information (e.g., sequence number, acknowledgment number, and window size) and may store this information in the sequence datastore. Thus, the sequence datastore 118 may now store up-to-date information regarding the network connection 108 and, thus, the network security device 106(2) may perform the security operations for the network connection 108.

FIGS. 2A-G illustrate an example scenario where the second network security device 106(2) of FIG. 1 switches from a standby state to an active state in response to the first network security device 106(1) experiencing a failure event. In addition, the second network security device 106(2) recovers sequence information associated with the communication session between the client device and the server device in response to this transition.

Figure 2A:
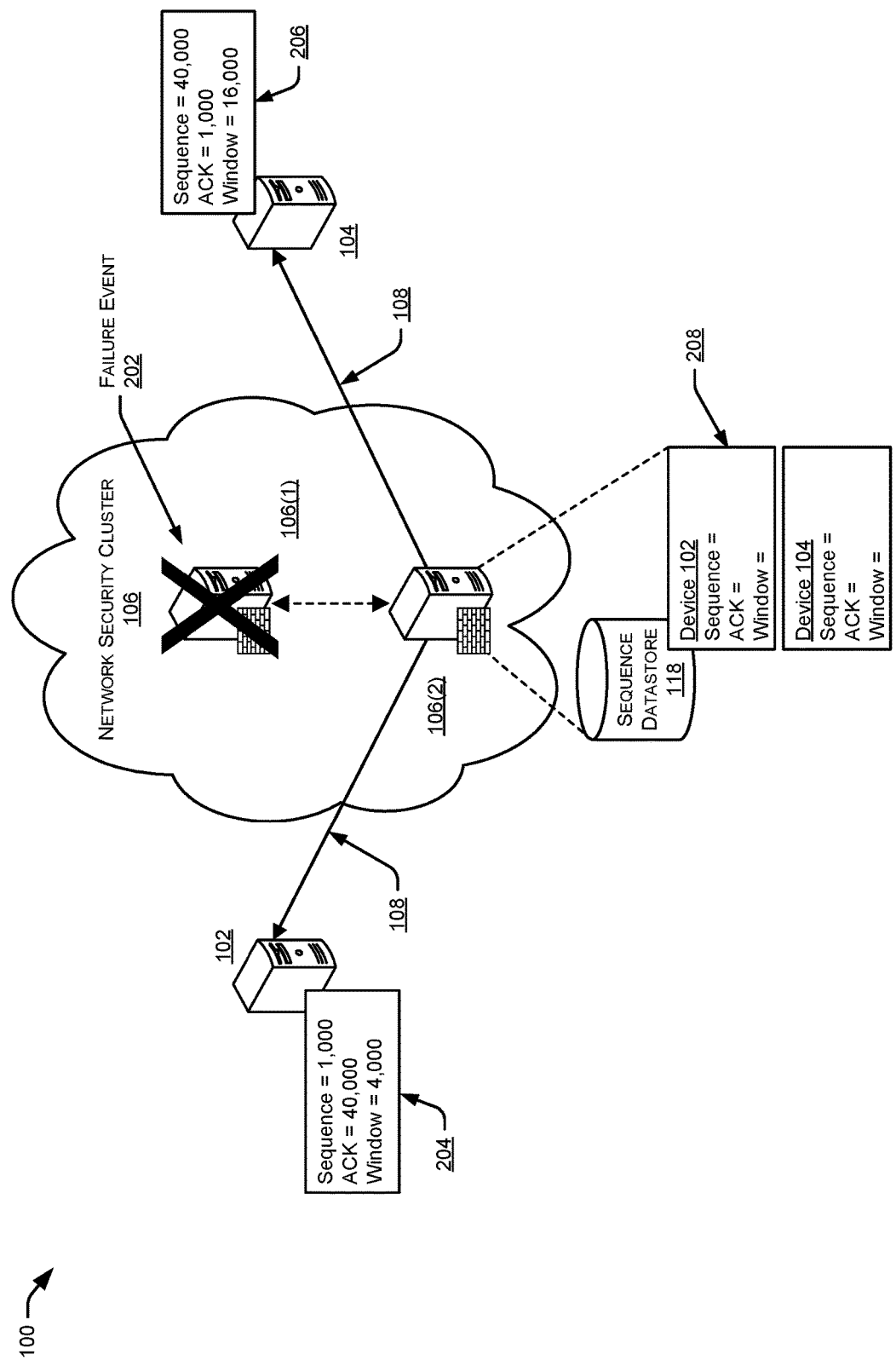

To begin, FIG. 2A illustrates that the network security device 106(1) initially responsible for performing security operations (e.g., firewall operations) for the network connection 108 experiences a failure event 202. In response, the network security device 106(2) transitions from a standby state to an active state. However, as illustrated, at this time the network security device 106(2) does not store sequence information for the communication session in the session datastore 118. In this regard, FIG. 2A illustrates that the client device stores sequence information 204, while the server devices stores sequence information 206.

As illustrated, the example sequence information 204 indicates that the next sequence number associated with communications sent from the client device 102 to the server device is 1,000. Thus, the next communication sent from the client device 102 is to be 1,000. In addition, the sequence information 204 indicates that the next acknowledgment number of the client device 102 is 40,000. That is, the last sequence number byte sent from the server device 104 is 39999. In addition, the sequence information 204 indicates that a current window size of acceptable communications received at the client device from the server device is 4,000. This means that the client device 102 will accept communications from the server device for bytes between 40,000 and 43,999, inclusive.

The sequence information 206 of the server device 104, meanwhile, indicates that the next sequence number associated with communications sent from the server device is 40,000 (which also corresponds to the next acknowledgment number from the sequence information 204). Thus, the next communication sent from the server device 104 to the client device 102 is to be 40,000. In addition, the sequence information 206 indicates that the next acknowledgment number of the server device 104 is 1,000. That is, the last sequence number byte sent from the client device 102 is 999. In addition, the sequence information 206 indicates that a current window size of acceptable communications received at the server device 104 from the client device 102 is 16,000. This means that the server device 104 will accept communications from the client device 102 between 1,000 and 16,999, inclusive. As illustrated at 208, however, the sequence datastore 118 of the newly-activated network security device 106(2) currently does not store any of the sequence information indicated by sequence information 204 or 206.

Figure 2B:
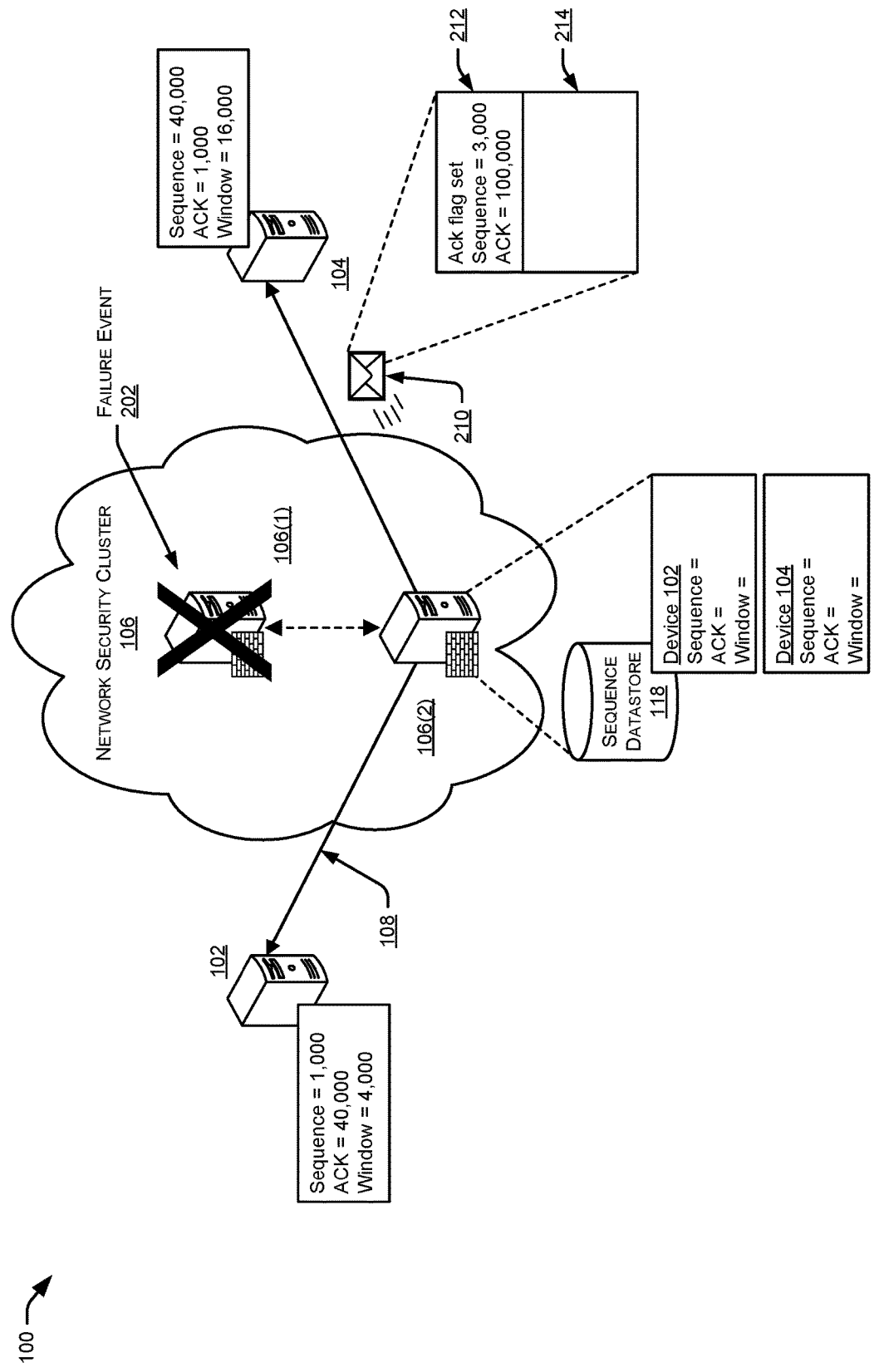

FIG. 2B illustrates that, in response to transitioning from the standby state to the active state, the network security device 106(2) may generate and send a first empty acknowledgment packet 210 to the server device 104. It is to be appreciated that the network security device 106(2) sends the packet 210 to the server device 104, it may additionally or alternatively send the packet 210 to the client device 102. Regardless, the example packet 210 indicates that the acknowledgment flag has been set and that a TCP header portion 212 of the packet 210 specifies a randomly selected sequence number (3,000) and a randomly selected acknowledgment number (100,000). In addition, a payload portion 214 of the packet is empty.

In response to receiving the empty acknowledgment packet 210, the server device 104 may determine whether the sequence number specified in the packet 210 is within the current window for communications received from the client device 102. In this example, because the sequence number (3,000) is within the acceptable window (1,001 to 17,000), the server device 104 may process the packet, which in this example results in the server device 104 simply dropping the packet, given that the packet does not include a payload.

FIG. 2C illustrates, meanwhile, that after waiting a predefined amount of time for a response from the server device 104 and failing to receive a response, the network security device 106(2) generates and sends a second empty acknowledgment packet 216 to the server device 104. As illustrated, the network security device 106(2) has selected a second sequence number, which may comprise the first sequence number incremented by a predefined offset which, in some instances, may be designed to be greater than the window size. In this example, a TCP header 218 of the packet 216 indicates that the new sequence number is 68,536, which is the first sequence number incremented by 65,536 or 64K, which may be a largest possible window in some instances. Again, the packet 216 may include an empty payload portion 220.

Figure 2D:
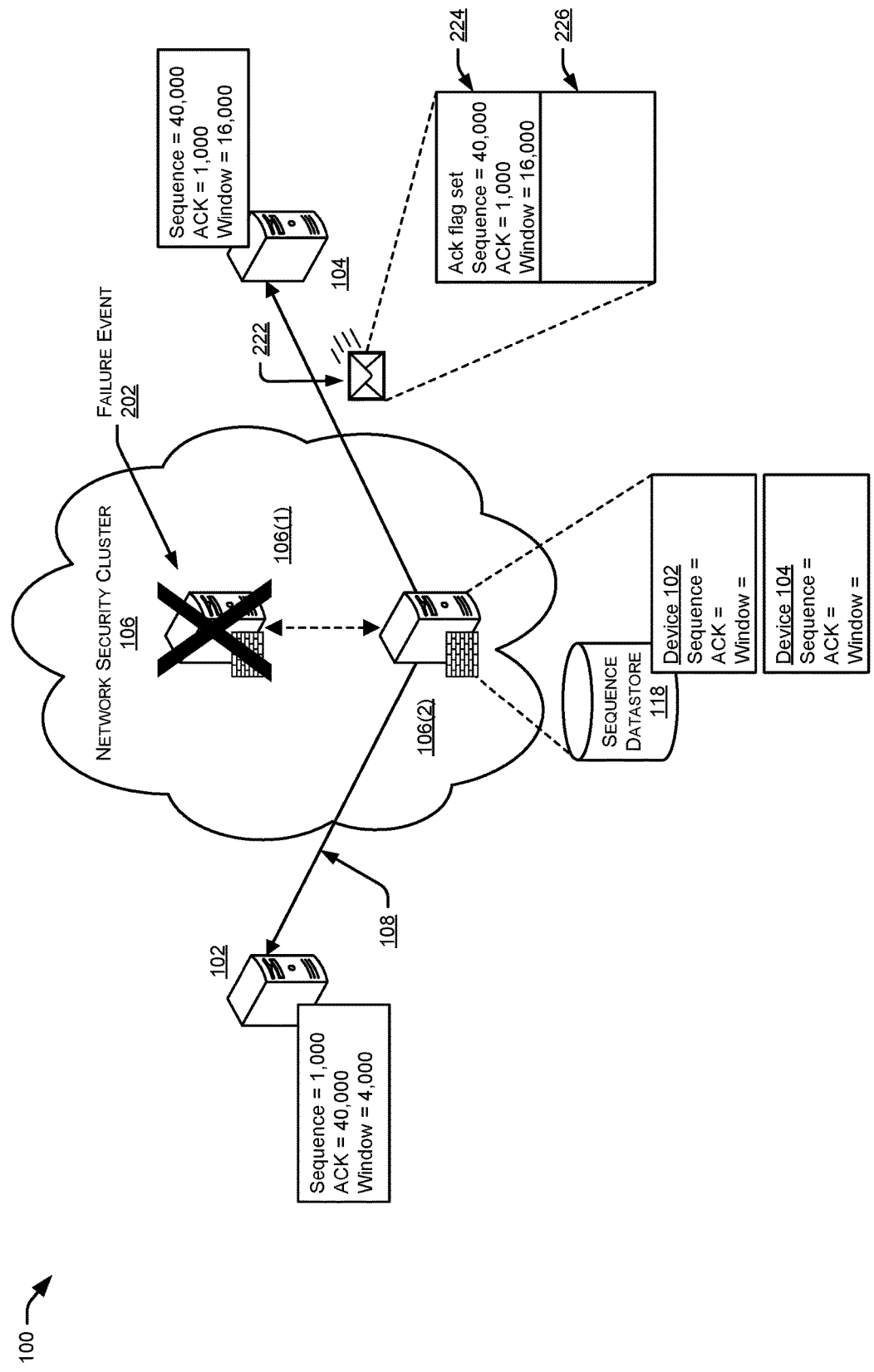

FIG. 2D illustrates that, upon receiving the packet 216, the server device 104 may determine that the specified sequence number (68,536) is outside of the acceptable window (1,000 to 16,999). Thus, in response, the server device 104 generates and sends, to the network security device 106(2), a packet 222 indicating the next sequence information 206 at the server device 104. For example, the packet may comprise an acknowledgment packet including a TCP header 224 indicating the next sequence number (40,000), the next acknowledgment number (1,000), and the current window size (16,000) for communications received from the client device 102. Further, the acknowledgment packet 222 may include an empty payload portion 226.

Figure 2E:
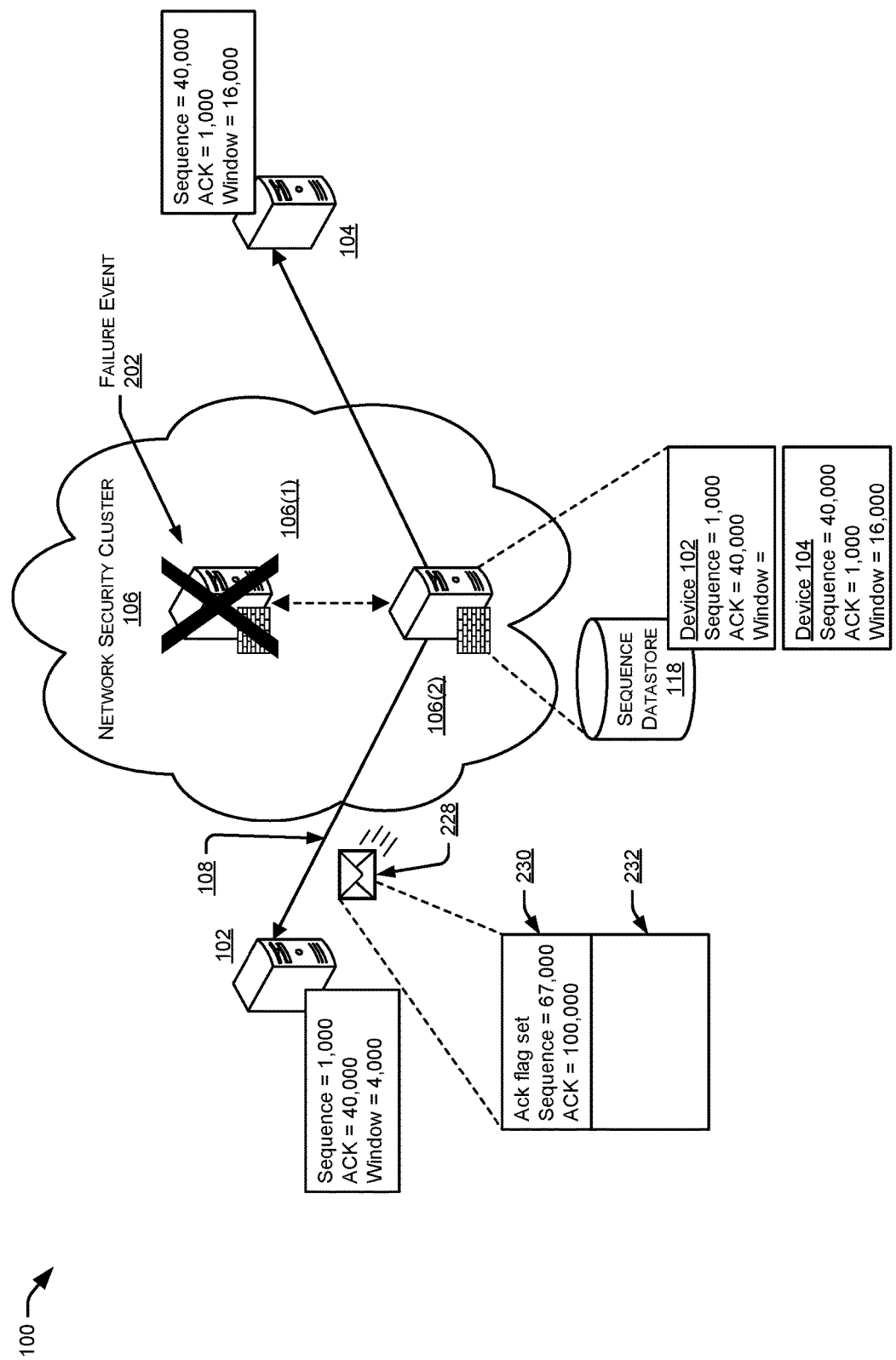

FIG. 2E indicates that, upon receiving the packet 222, the network security device 106(2) may update the sequence datastore 118 based on the received sequence information. For example, the network security device 106(2) may update its datastore 118 to indicate that a next sequence number for communications sent from the server device 104 to client device 102 is 40,000, that a next sequence number for communications sent from the client device 102 to the server device 104 is 1,000, and that the window size maintained at the server device 104 is 16,000. At this point, the sequence datastore 118 may store the sequence information for the communication session, other than the window size maintained at the client device 102.

Thus, FIG. 2E further illustrates that the network security device 106(2) may generate and send another empty acknowledgment packet 228 to the client device, with this packet including a TCP header 230 specifying a sequence number (67,000) that may be randomly selected or may be based on information learned from the packet 222 received from the server device 104. Again, the packet 228 may include an empty payload portion 232.

Figure 2F:
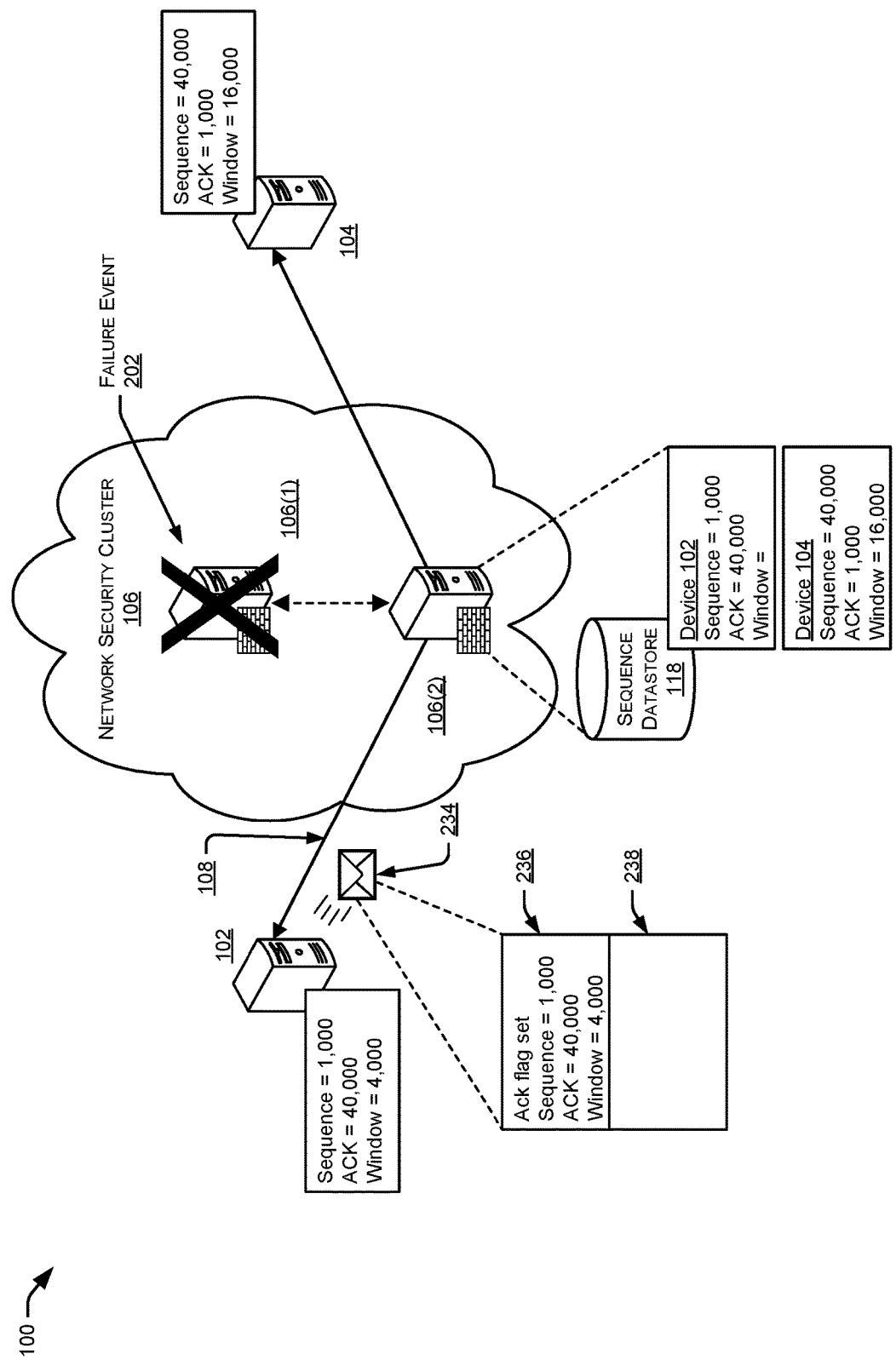

FIG. 2F illustrates that, upon receiving the packet 228, the client device 102 may determine that the specified sequence number (67,000) is outside of the current window for communications received from the server device (40,000 to 43,999) and, thus the client device 102 generates a packet

234. As illustrated, the packet 234 may comprise an acknowledgment packet that specifies, in a TCP header 236, a next sequence number for communications sent from the client device (1,000), a next acknowledgment number (40,000), and a window size (4,000) defining an acceptable window for communications received at the client device 102 from the server device 104. Again, the packet 234 may include an empty payload portion 238.

FIG. 2G illustrates that the network security device 106(2) may receive the empty acknowledgment packet 234 and may update the sequence datastore 118. As illustrated, the sequence datastore 118 now indicates that the window size maintained at the client device is 4,000. In addition, the sequence datastore 118 now indicates that the next sequence number for the client device is 1,000. With this information, the sequence datastore 118 is now up-to-date and, thus, the network security device 106(2) may be able to determine whether communications sent between the client device 102 and the server device 104 (via the network connection 108) are within an acceptable window range (and, thus, may be passed along if they pass one or more other security checks) or outside of the acceptable window and, thus, are to be discarded.

Figure 3A:
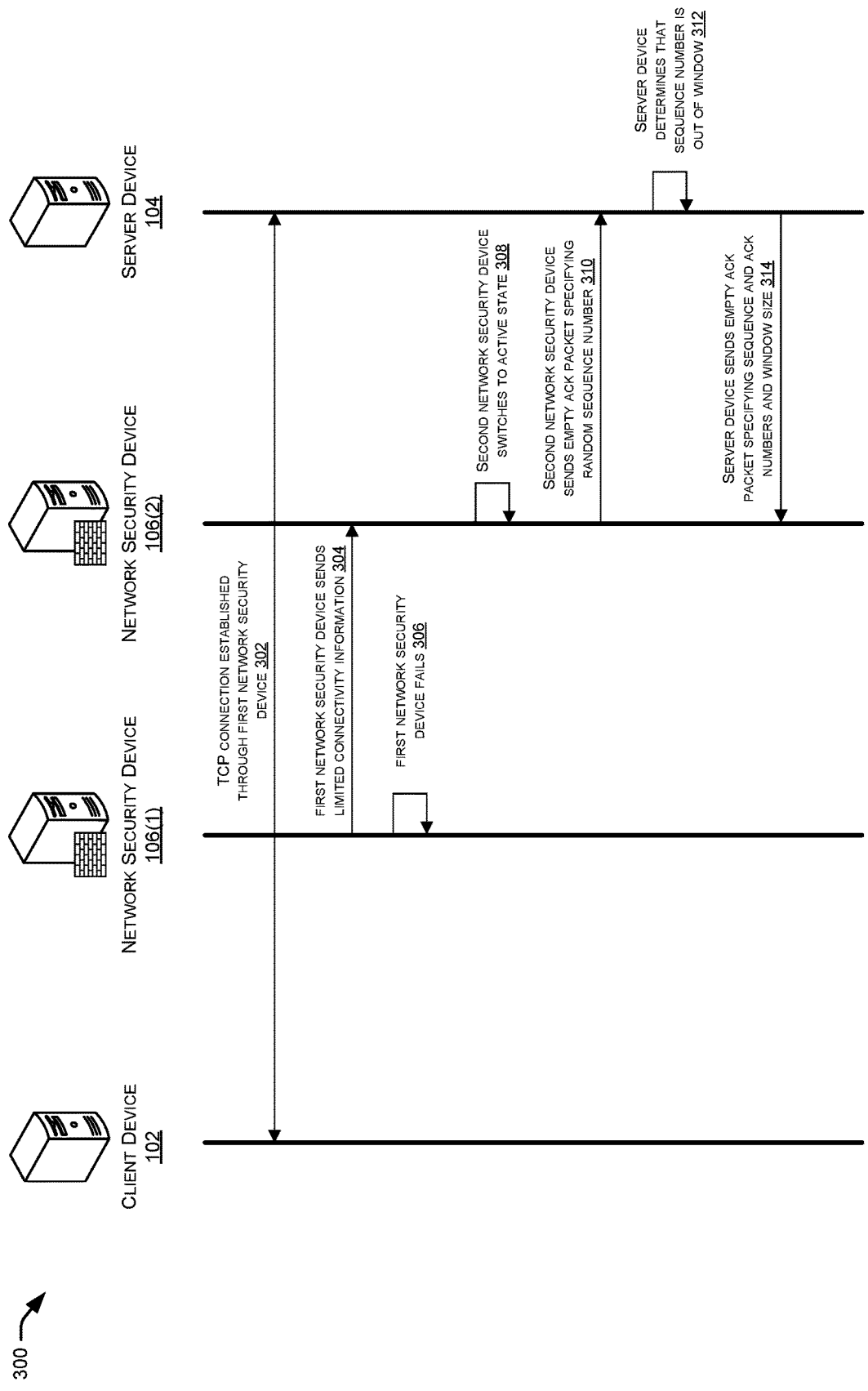
FIGS. 3A-B illustrate an example diagram of communications that the devices of FIG. 1 may exchange in order to ensure that the second firewall device recovers the sequence information associated with the communication session between the client device and the server device.
Figure 3B:
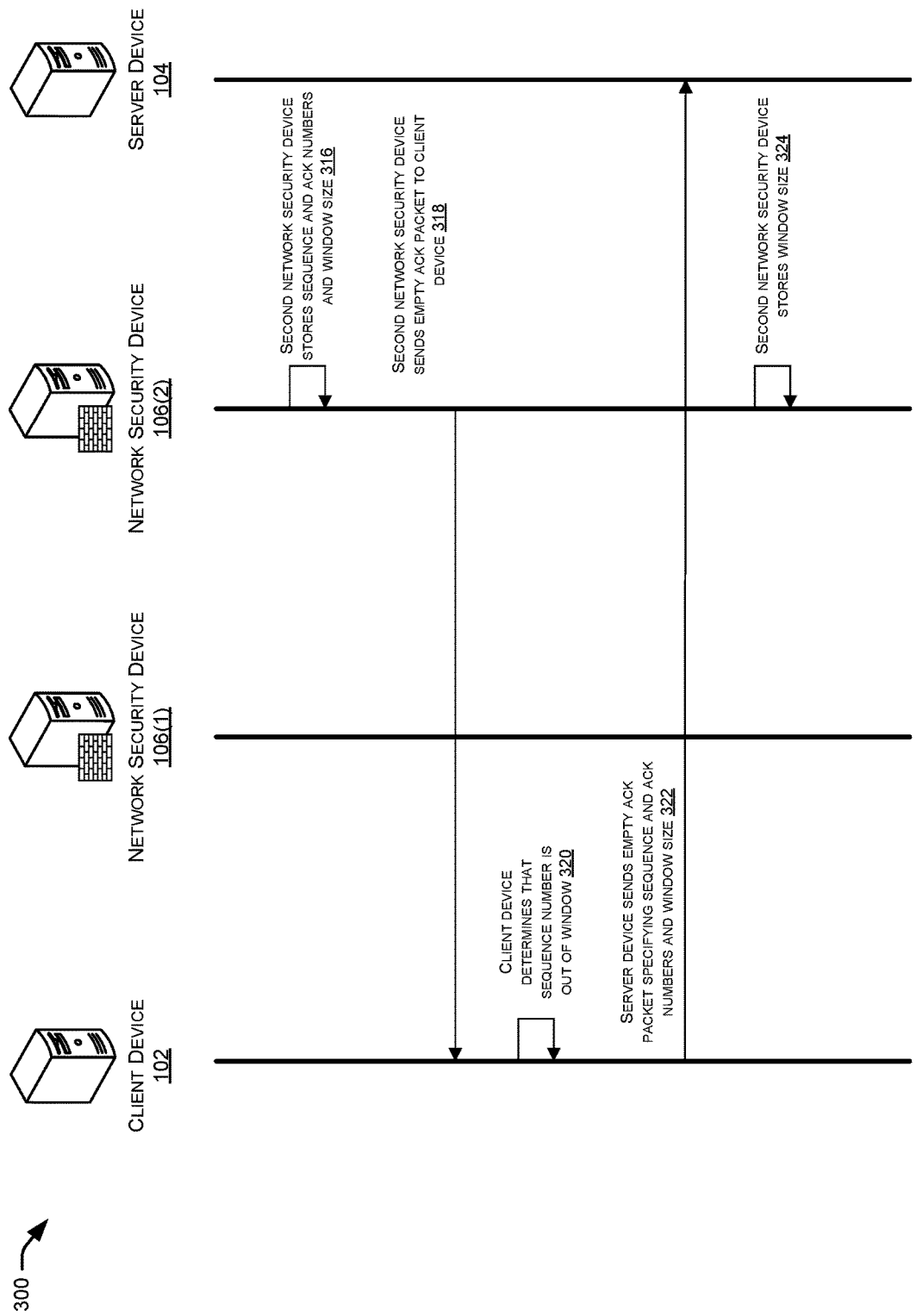

FIGS. 3A-B illustrate an example diagram 300 of communications that the devices of FIG. 1 may exchange in order to ensure that the second network security device recovers the sequence information associated with the communication session between the client device 102 and the server device 104.

At 302, a TCP connection is established between the client device 102 and the server device 104. The TCP connection is shown in FIG. 1 as the network connection 108. It should be appreciated that the network connection 108 may be any network connection enabling packets to be exchanged between the client device 102 and the server 104 along a network path. For simplicity, the network connection 108 is described herein as a TCP network connection, and the packets exchanged between the client device 102 and the server device 104 are described herein as TCP packets. Likewise, the synchronization information described herein, in one example, pertains to synchronization information that enables the network security devices 106(1) and/or 106(2) to evaluate and verify TCP packets.

The TCP connection is established between the client device 102 and the server device 104 through the original active network security device 106(1). At 304, the network security device 106(1) sends limited connection information to the standby network security device 106(2) in the cluster 106. For example, the network security device 106(1) may send, to the network security device 106(2), "keepalive" messages to maintain a connection between these two network security devices. The keepalive messages, in general, indicate to the standby network security device 106(2) that the connection 108 is still active. The keepalive messages, however, do not contain state information. Additionally, the network security device 106(1) sends, to the network security device 106(2), information pertaining to a source device and destination device of the network connection 108. For example, the network security device 106(1) sends, to the network security device 106(2), the source address (e.g., Internet Protocol (IP) address) of the client device 102, the destination address of the server device 104, source port information (e.g., TCP port information) associated with the client device 102 and destination port information associated with the server device 104. However, the connection information sent by network security device 106(1) at 304 does not include synchronization information. That is, the network security device 106(1) sends limited connection information to the network security device 106(2) but does not send the synchronization information (e.g., comprising the expected sequence numbers and acknowledgment numbers for packets that are received on the network connection 108). Sending the limited connection information is less bandwidth-intensive and resource-consuming than sending the synchronization information.

At 306, the network security device 106(1) experiences a failure event. For example, the failure event may include a connectivity failure of the network security device 106(1) in the network 100 and/or a hardware/software failure of network security device 106(1). Though not shown in FIG. 3, when the network security device 106(1) experiences a failure event, the network security device 106(2) detects that the network security device 106(1) has experienced a failure event. For example, the network security device 106(2) may receive a message indicating that the network security device 106(1) has experienced a failure event or the network security device 106(2) may detect an absence of the network security device 106(1) based on the absence of receiving periodic keepalive messages from the network security device 106(1).

In response to detecting the failure event, the network security device 106(2) changes from a standby state to an active state, as shown at 308. Thus, upon changing its state from a standby state to an active state, the network security device 106(2) is now the new active network security device, and accordingly, the network security device 106(2) is responsible for protecting packets exchanged between the client device 102 and the server device 104 along the network connection 108. It should be appreciated that although the original active the network security device 106(1) experienced a failure event, the network connection 108 between the client device 102 and the server device 104 is still operational. After the failure event, the network connection 108 includes the newly active network security device 106(2), which thus manages the network connection 108 after the failure event.

After changing to the active state from the standby state, the network security device 106(2) generates an empty acknowledgment packet specifying a randomly selected sequence number. This empty acknowledgment packet generated by the network security device 106(2) is a message that is intended to trigger a response message to be sent to the network security device 106(2) by a network device that is the destination of the packet. The response by the destination of empty acknowledgment packet message includes the synchronization information used by the the network security device 106(2) to perform the protection services for the client device 102 and the server device 104 for packets received along the network connection 108. In one example, the network security device 106(2) generates the empty acknowledgment packet using at least a portion of the limited-connection information associated with the connection 108 previously provided by the network security device 106(1) (in operation 304) before the failure event.

At 310, the network security device 106(2) sends the empty acknowledgment packet specifying the randomly selected sequence number to the server device 104. Upon receiving the empty acknowledgment packet, the server device 104 (which is the destination of the packet) may determine that the specified sequence number is out of the current window of acceptable communications from the client device 102, as shown at 312. At 314, the server device 104 responds by sending synchronization information (or "sequence information") to the network security device

106(2). In one example, the empty acknowledgment packet sent from the network security device 106(2) spoofs the source address, destination address, and TCP ports of the original connection 108. As a result, the server device 104 assumes that the packet was sent by the client device 102. In some instances, the server device 104 sends an empty acknowledgment message ("TCP ACK" message) to the network security device 106(2). In some instances, the packet sent from the server device 104 contains the synchronization information (e.g., next-expected sequence numbers and acknowledgment numbers).

FIG. 3B continues the illustration and includes, at 316, that the network security device 106(2) may store the sequence information (e.g., sequence number, acknowledgment number, and window size) upon receiving the packet from the server device 104. In addition, at 318 the network security device 106(2) may send another empty acknowledgment packet to the client device 102, with this packet specifying a sequence number that is out of an acceptable window maintained by the client device 102 in this example. At 320, the client device 102 determines that the specified sequence number is out of the window and, thus, the client device 2 responds by sending synchronization information (or "sequence information") to the network security device 106(2), as shown at 322. In one example, the empty acknowledgment packet sent from the network security device 106(2) to the client device 102 spoofs the source address, destination address, and TCP ports of the original connection 108. As a result, the client device 102 assumes that the packet was sent by the server device 104. In some instances, the client device 102 sends an empty acknowledgment message to the network security device 106(2). In some instances, the packet sent from the client device 102 contains the sequence information (e.g., next-expected sequence numbers and acknowledgment numbers). At 324, the network security device 106(2) may store the sequence information (e.g., sequence number, acknowledgment number, and window size) upon receiving the packet from the client device 102.

In some instances, this sequence or synchronization information stored in the sequence datastore 118 may contain sufficient information for the network security device 106(2) to recreate some or all of the stateful session between client device 102 and server device 104. Thus, upon receiving subsequent data packets along the network connection 108, the network security device 106(2) may use the stored sequence information to determine whether the packets are authorized or unauthorized packets. Thus, firewall 106(2) may prevent a malicious third-party TCP spoofing attack by storing the synchronization information received from the server device 104. It should be appreciated that if the network security device 106(2) does not receive a packet from server device 104 or the client device 102 after a predetermined period, the network security device 106(2) may generate another empty acknowledgment packet specifying a new sequence number.

Figure 4A:
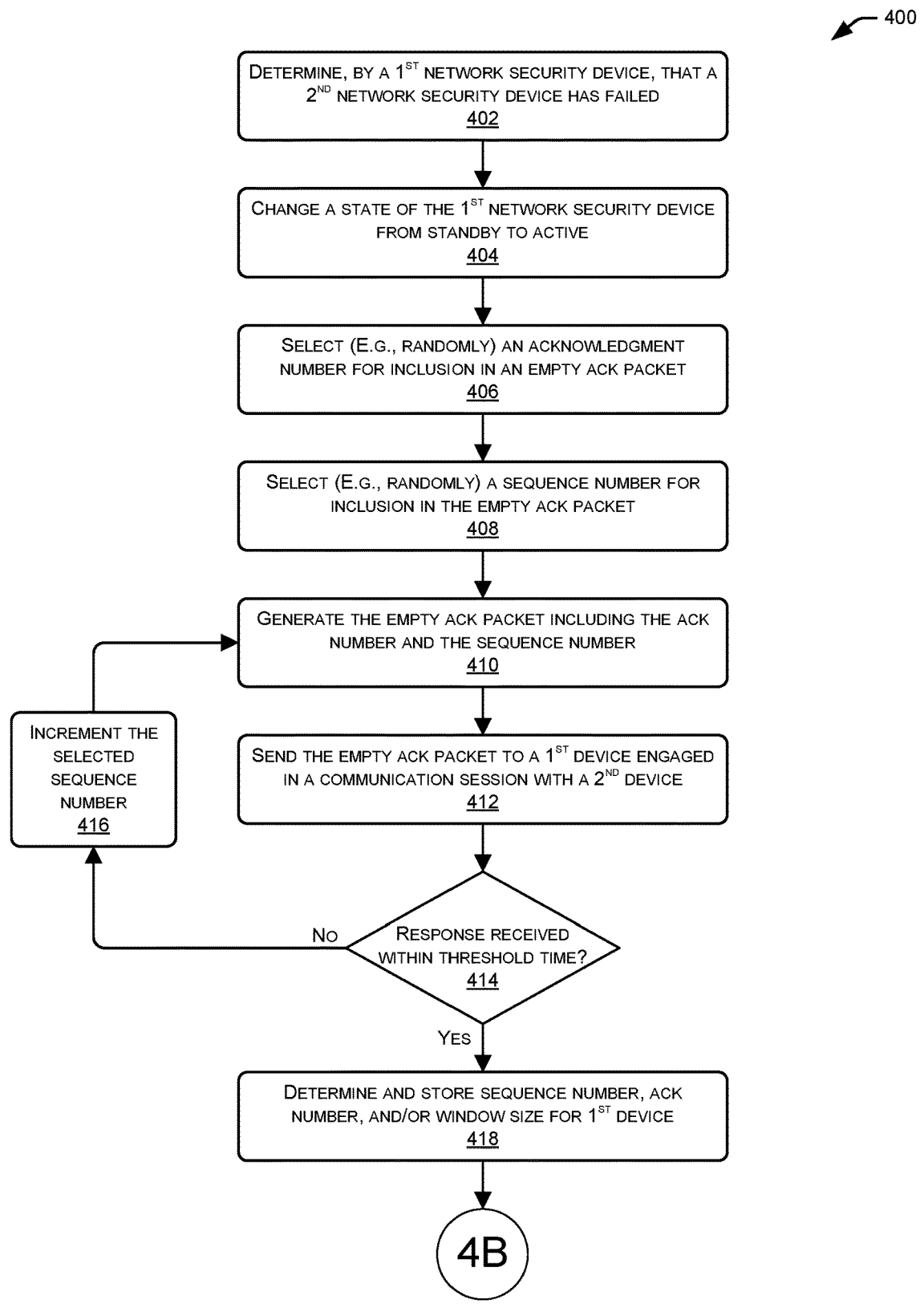
FIGS. 4A-B illustrate an example process that a network security device, such as a firewall device, may implement in order to determine sequence information associated with a communication session between a first device and a second device, such as the client device and the server device of FIG. 1.
Figure 4B:
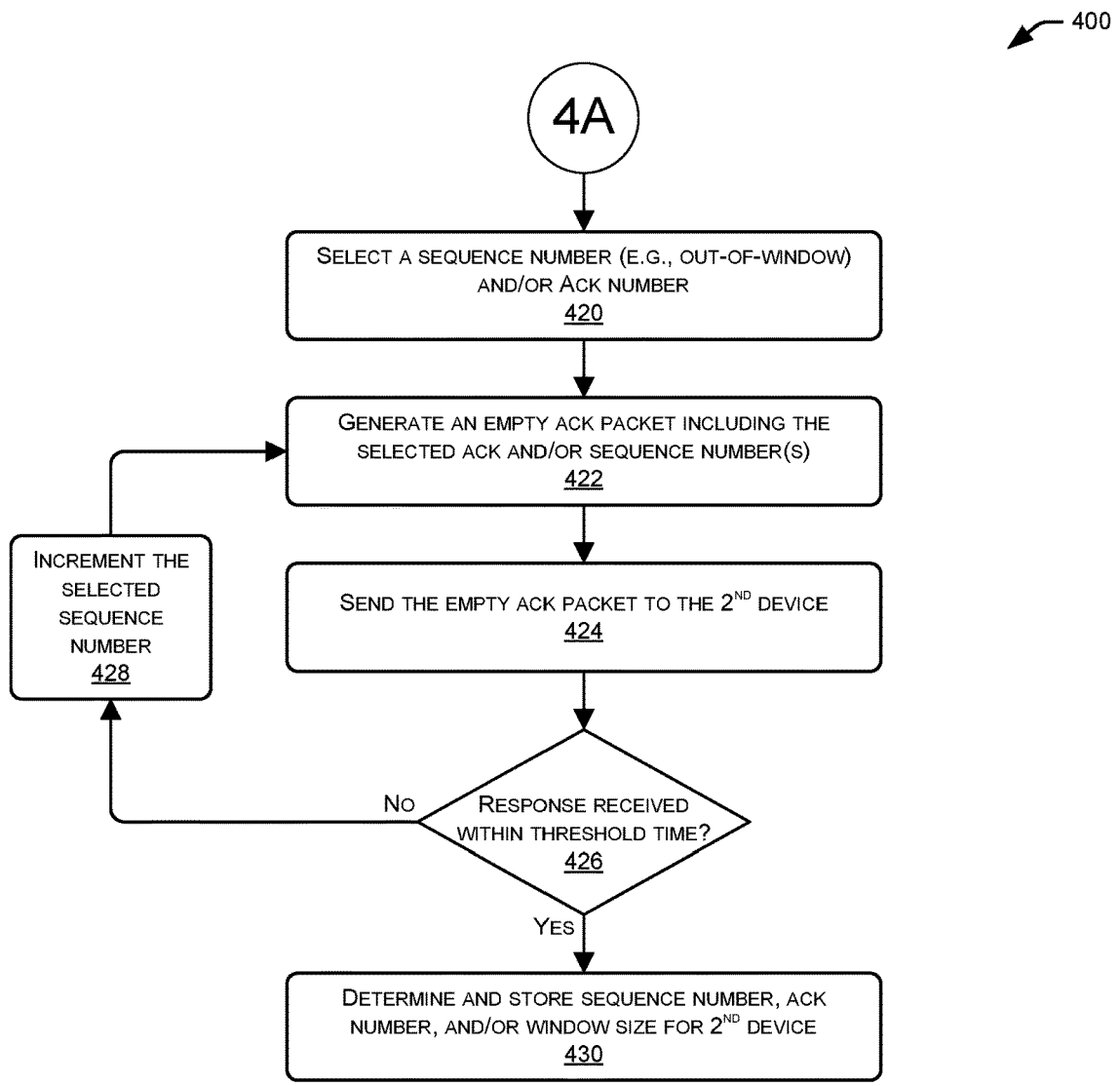

FIGS. 4A-B illustrate an example process 400 that a network security device, such as a firewall device, may implement in order to determine sequence information associated with a communication session between a first device and a second device, such as the client device and the server device of FIG. 1. This method, and other methods described below, may be implemented (1) as a sequence of computer-implemented acts or program modules running on a computing system and/or (2) as interconnected machine logic circuits or circuit modules within the computing system. Further, while the following methods are described as being performed by an example host server, it is to be appreciated that one or more other computing devices may additionally or alternatively perform some or all of these operations.

At an operation 402, a first network security device may determine that a second network security device configured to monitor a communication session between a first device and a second device has experienced a failure event. As described above, the first network security device may make this determination in response to receiving an explicit message or in response to failing to receive a keepalive message, or the like, for a threshold amount of time. At an operation 404, the first network security device may change its state from a standby state to an active state. In the active state, the first network security device may assume responsibility for performing security operations for the communication session between the first and second devices.

At an operation 406, the first network security device may select (e.g., randomly) an acknowledgment number for inclusion in a first packet (e.g., an empty acknowledgment packet) to send to the first device and, at an operation 408, may select (e.g., randomly) a sequence number for inclusion in the packet. At an operation 410, the first network security device may generate the first packet, including the selected numbers, and may send the first packet to the first device at an operation 412.

At an operation 414, the first network security device determines whether a response has been received from the first device within a threshold amount of time. As described above, this may be representative of whether the specified sequence number happened to fall within an acceptable window range maintained at the first device, given that the first device may refrain from responding to the packet if so. Instead, given the empty payload, the first device may simply drop the packet. If the first network security device determines that a response has not been received within the threshold time, then at an operation 416 the first network security device increments the selected sequence number by, for example increasing or decreasing the number selected at the operation 408 by a predefined amount. The process 400 then proceeds back to the operation 410 to generate a packet (specifying the incremented sequence number) and send the packet to the first device.

If, however, a response is received by the first network security device within the threshold amount of time (or after incrementing the sequence number one or more times and receiving a response within the threshold amount of time), then at an operation 418 the first network security device determines, from the received response (e.g., empty acknowledgment packet) sequence information such as a next sequence number, a next acknowledgment number, a window size, and/or the like. The first network security device may also store some or all of this information in a local datastore, such as the sequence datastore 118.

FIG. 4B continues the illustration and includes, at an operation 420, selecting a sequence number and/or an acknowledgment number for inclusion in a packet (e.g., an empty acknowledgment packet) to send to the second device. At an operation 422, the first network security device may generate the additional packet, including the selected numbers, and may send the packet to the second device at an operation 424.

At an operation 426, the first network security device determines whether a response has been received from the first device within a threshold amount of time. As described above, this may be representative of whether the specified sequence number happened to fall within an acceptable window range maintained at the second device, given that the second device may refrain from responding to the packet if so. Instead, given the empty payload, the second device may simply drop the packet. If the first network security device determines that a response has not been received within the threshold time, then at an operation 428 the first network security device increments the selected sequence number by, for example increasing or decreasing the number selected at the operation 420 by a predefined amount. The process 400 then proceeds back to the operation 422 to generate a packet (specifying the incremented sequence number) and send the packet to the second device.

If, however, a response is received by the first network security device within the threshold amount of time (or after incrementing the sequence number one or more times and receiving a response within the threshold amount of time), then at an operation 430 the first network security device determines, from the received response (e.g., empty acknowledgment packet) sequence information such as a next sequence number, a next acknowledgment number, a window size, and/or the like. The first network security device may also store some or all of this information in a local datastore, such as the sequence datastore 118.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-4B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
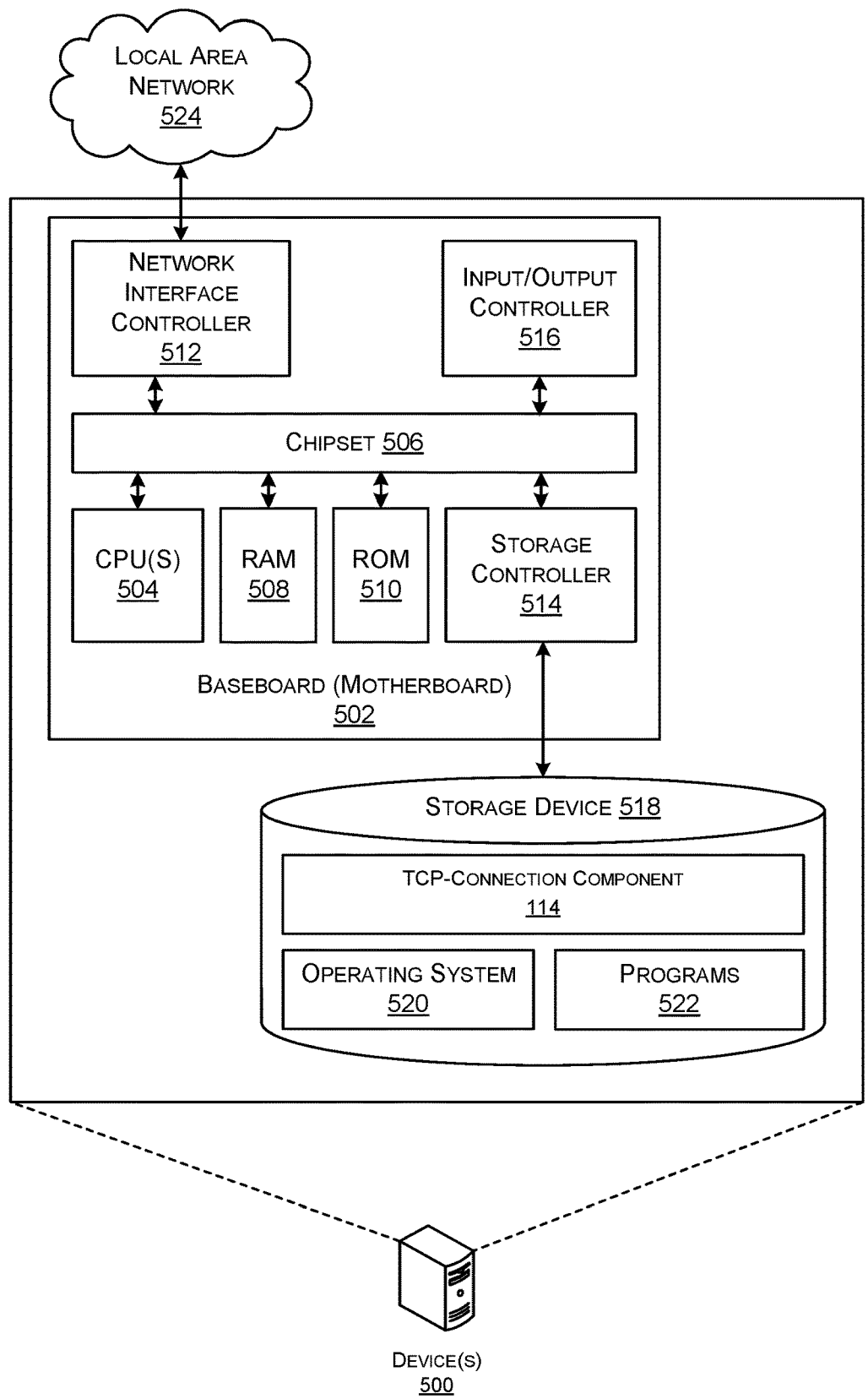
FIG. 5 is a computer architecture diagram showing an illustrative computer hardware architecture for implementing a device that can be utilized to implement aspects of the various technologies presented herein.

FIG. 5 is a computer architecture diagram showing an illustrative computer hardware architecture for implementing a device 500 that can be utilized to implement aspects of the various technologies presented herein, such as some or all of the operations performed by the network security devices, the client device, and/or the device.

The device 500 includes a baseboard 502, or "motherboard," which is a printed circuit board to which a multitude of components or devices can be connected by way of a system bus or other electrical communication paths. In one illustrative configuration, one or more central processing units (CPUs) 504 operate in conjunction with a chipset 506. The CPUs 504 can be standard programmable processors that perform arithmetic and logical operations necessary for the operation of the device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the device 500. The chipset 506 can further provide an interface to a computer-readable storage medium such as a read-only memory (ROM) 510 or non-volatile RAM (NVRAM) for storing basic routines that help to startup the device 500 and to transfer information between the various components and devices. The ROM 510 or NVRAM can also store other software components necessary for the operation of the device 500 in accordance with the configurations described herein.

The device 500 can operate in a networked environment using logical connections to remote computing devices and computer systems through a network, such as a local area network 524. The chipset 506 can include functionality for providing network connectivity through a Network Interface Card (NIC) 512, such as a gigabit Ethernet adapter. The NIC 512 is capable of connecting the device 500 to other computing devices over the network. It should be appreciated that multiple NICs 512 can be present in the device 500, connecting the computer to other types of networks and remote computer systems.

The device 500 can be connected to a storage device 518 that provides non-volatile storage for the computer. The storage device 518 can store an operating system 520, programs 522, and data, which have been described in greater detail herein. The storage device 518 can be connected to the device 500 through a storage controller 514 connected to the chipset 506. The storage device 518 can consist of one or more physical storage units. The storage controller 514 can interface with the physical storage units through a serial attached SCSI (SAS) interface, a serial advanced technology attachment (SATA) interface, an FC interface, or other type of interface for physically connecting and transferring data between computers and physical storage units.

The device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 500 can further read information from the storage device 518 by detecting the physical states or characteristics of one or more particular locations within the physical storage units.

In addition to the mass storage device 518 described above, the device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the device 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the device 500.

In one embodiment, the storage device 518 or other computer-readable storage media is encoded with computer-executable instructions which, when loaded into the device 500, transform the computer from a general-purpose computing system into a special-purpose computer capable of implementing the embodiments described herein. These computer-executable instructions transform the device 500 by specifying how the CPUs 504 transition between states, as described above. According to one embodiment, the device 500 has access to computer-readable storage media storing computer-executable instructions which, when executed by the device 500, perform the various processes described above with regard to FIGS. 2A-4B. The device 500 can also include computer-readable storage media having instructions stored thereupon for performing any of the other computer-implemented operations described herein.

The device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the device 500 might not include all of the components shown in FIG. 5, can include other components that are not explicitly shown in FIG. 5, or might utilize an architecture completely different than that shown in FIG. 5.

The device 500 may also store, in the storage device 518, the TCP-connection component 114, discussed above. The TCP-connection component 114 may be configured to perform some or all of the techniques described above with reference to FIGS. 1-4B.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A network security device configured to monitor a communication session between a first device and a second device, the network security device comprising:
   one or more processors; and
   one or more non-transitory computer-readable media storing computer-executable instructions that, when executed by the one or more processors, cause the one or more processors to perform acts comprising:
      generating a first empty acknowledgment packet specifying a first sequence number;
      sending the first empty acknowledgment packet to the first device;
      determining that a response from the first device has not been received within a threshold amount of time;
      generating, at least partly in response to the determining, a second empty acknowledgment packet specifying a second sequence number;
      sending the second empty acknowledgment packet to the first device;
      receiving, from the first device, a third empty acknowledgment packet specifying a third sequence number; and
      storing the third sequence number in association with the communication session between the first device and the second device.

2. The network security device as recited in claim 1, the acts further comprising:
   determining that a second network security device configured to monitor the communication session between the first device and the second device has experienced a failure event; and
   changing a state of the network security device from a standby state to an active state at least partly in response to determining that the second network security device has experienced the failure event;
   and wherein the generating of the first empty acknowledgment packet comprises generating the first empty acknowledgment packet at least partly in response to determining that the second network security device has experienced the failure event.

3. The network security device as recited in claim 1, the acts further comprising randomly selecting the first sequence number prior to the generating of the first empty acknowledgment packet.

4. The network security device as recited in claim 3, the acts further comprising selecting the second sequence number prior to the generating of the second empty acknowledgment packet, the second sequence number comprising the first sequence number at least one of increased or decreased by a predefined offset.

5. The network security device as recited in claim 1, wherein:
   the second empty acknowledgment packet sent to the first device further specifies a first acknowledgment number;

the third empty acknowledgment packet further specifies a second acknowledgment number; and the acts further comprise storing the second acknowledgment number in association with the communication session between the first device and the second device.

6. The network security device as recited in claim 1, wherein:

the third empty acknowledgment packet further specifies a window size of acceptable sequence numbers that the first device will accept before receiving a subsequent acknowledgment packet from the second device; and the acts further comprise storing the window size in association with the communication session between the first device and the second device.

7. The network security device as recited in claim 1, the acts further comprising:

generating a fourth empty acknowledgment packet specifying a fourth sequence number;

sending the fourth empty acknowledgment packet to the second device;

receiving, from the fourth device, a fifth empty acknowledgment packet specifying a fifth sequence number; and storing the fifth sequence number in association with the communication session between the first device and the second device.

8. A method implemented at least in part by a network security device communicatively coupled to a first device and a second device, the method comprising:

generating a first packet specifying a first sequence number;

sending the first packet to the first device;

determining that a response from the first device has not been received within a threshold amount of time;

generating, at least partly in response to the determining, a second packet specifying a second sequence number;

sending the second packet to the first device;

receiving, from the first device, a third packet specifying a third sequence number; and storing the third sequence number in association with a communication session between the first device and the second device.

9. The method as recited in claim 8, wherein:

the first packet does not include a payload and indicates that an acknowledgment flag of the first packet has been set; and the second packet also does not include a payload and also indicates that an acknowledgment flag of the second packet has been set.

10. The method as recited in claim 8, further comprising:

determining that a second network security device configured to monitor the communication session between the first device and the second device has experienced a failure event; and changing a state of the network security device from a standby state to an active state at least partly in response to determining that the second network security device has experienced the failure event;

and wherein the generating of the first packet comprises generating the first packet at least partly in response to determining that the second network security device has experienced the failure event.

11. The method as recited in claim 8, further comprising randomly selecting the first sequence number prior to the generating of the first packet.

12. The method as recited in claim 11, further comprising selecting the second sequence number prior to the generating of the second packet, the second sequence number comprising the first sequence number at least one of increased or decreased by a predefined offset.

13. The method as recited in claim 8, wherein:

the second packet sent to the first device further specifies a first acknowledgment number;

the third packet further specifies a second acknowledgment number; and the method further comprises storing the second acknowledgment number in association with the communication session between the first device and the second device.

14. The method as recited in claim 8, wherein:

the third packet further specifies a window size of acceptable sequence numbers that the first device will accept before receiving a subsequent acknowledgment packet from the second device; and the method further comprises storing the window size in association with the communication session between the first device and the second device.

15. The method as recited in claim 8, further comprising:

generating a fourth packet specifying a fourth sequence number;

sending the fourth packet to the second device;

receiving, from the fourth device, a fifth packet specifying a fifth sequence number; and storing the fifth sequence number in association with the communication session between the first device and the second device.

16. A network security device communicatively coupled to a first device and a second device, the network security comprising:

one or more processors; and one or more non-transitory computer-readable media storing computer-executable instructions that, when executed by the one or more processors, cause the one or more processors to perform acts comprising:

sending, to the first device, a first empty acknowledgment packet specifying a first sequence number;

receiving, from the first device, a second empty acknowledgment packet specifying a second sequence number; and storing the second sequence number in association with a communication session between the first device and the second device.

17. The network security device as recited in claim 16, wherein the first empty acknowledgment packet does not include a payload and indicates that an acknowledgment flag of the first packet has been set.

18. The network security device as recited in claim 16, the acts further comprising:

determining that a second network security device configured to monitor the communication session between the first device and the second device has experienced a failure event; and changing a state of the network security device from a standby state to an active state at least partly in response to determining that the second network security device has experienced the failure event;

and wherein the sending of the first empty acknowledgment packet comprises sending the first empty acknowledgment packet at least partly in response to determining that the second network security device has experienced the failure event.

19. The network security device as recited in claim 16, the acts further comprising:

determining that a response from the first device has not been received within a threshold amount of time;

sending, at least partly in response to the determining and prior to the receiving of the second empty acknowledgment packet, a third empty acknowledgment packet specifying a third sequence number to the first device.

20. The network security device as recited in claim 19, the acts further comprising:

randomly selecting the first sequence number prior to the generating of the first empty acknowledgment packet; and selecting the third sequence number prior to the generating of the third empty acknowledgment packet, the third sequence number comprising the first sequence number at least one of increased or decreased by a predefined offset.

\* \* \* \* \*